March 27, 1928.
M. W. COLLET
SHADER FOR CAMERAS AND IN THE ART OF REGULATING
LOCALLY THE SHADING OF A PHOTOGRAPH
Filed Feb. 4, 1919    2 Sheets-Sheet 1
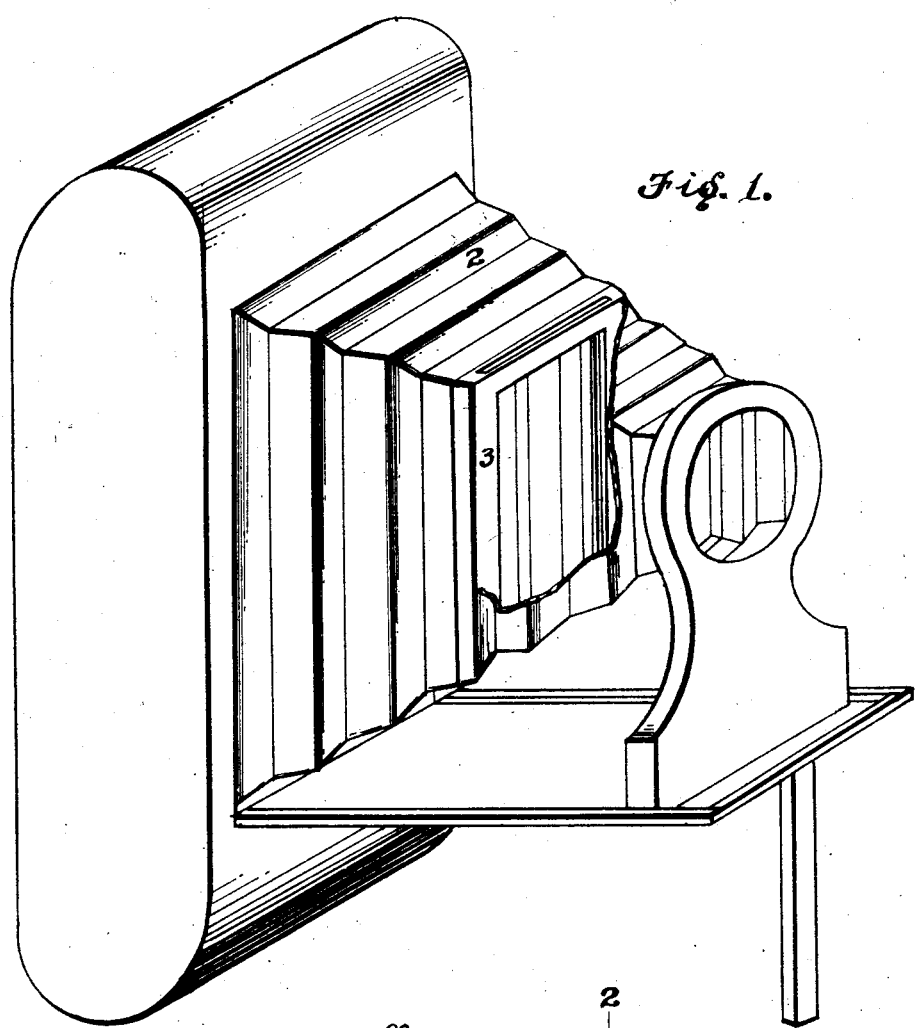
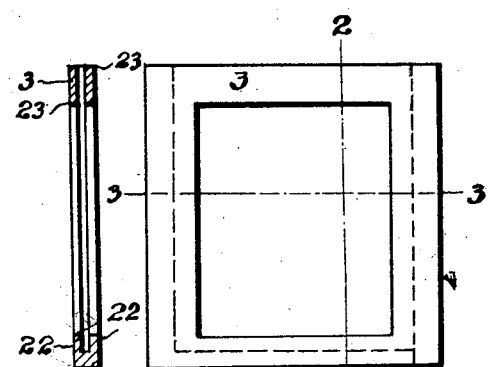

March 27, 1928. 1,663,996
M. W. COLLET
SHADER FOR CAMERAS AND IN THE ART OF REGULATING
LOCALLY THE SHADING OF A PHOTOGRAPH
Filed Feb. 4, 1919 2 Sheets-Sheet 2

M. W. Collet, Inventor
By F. E. Stebbins, Atty.

Patented Mar. 27, 1928.

1,663,996.

UNITED STATES PATENT OFFICE.

MARK W. COLLET, OF PHILADELPHIA, PENNSYLVANIA.

SHADER FOR CAMERAS AND IN THE ART OF REGULATING LOCALLY THE SHADING OF A PHOTOGRAPH.

Application filed February 4, 1919. Serial No. 275,020.

In shaders for cameras and in the art of regulating locally the shading of a photograph, of which the following is a specification, the device and the practice of the art depend upon the principle that reduction of the quantity of light falling on areas of a sensitive plate or sensitive film can be effected by the placing of obstructions between the plate, or the film and the lens that will cut off a portion of the light that passes through the lens and would, if these obstructions were not so placed, impinge upon points in areas to be shaded. The general principles governing the positioning of such obstructions, their construction, conformation and arrangement, and some of the purposes of so doing are set forth in my Patent No. 1,254,579, dated Jan. 22nd, 1918.

My present device and process enables these obstructions to be positioned more readily and certainly; the obstructions are produced photographically, or a photographic indication of their appropriate positions, shapes and the depth of shading is produced so that appropriate obstructions may be laid to effect the desired shading of the sensitive plate or film without necessitating an actual inspection of the shader inside the camera. Consequently, ordinary standard forms of film cameras, as well as plate cameras may be used with the present device.

Figure 10:
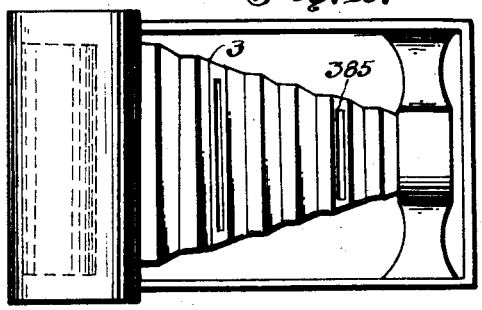
Figure 11:
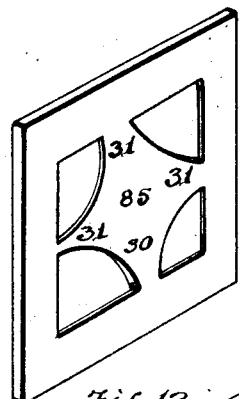
Figure 9:
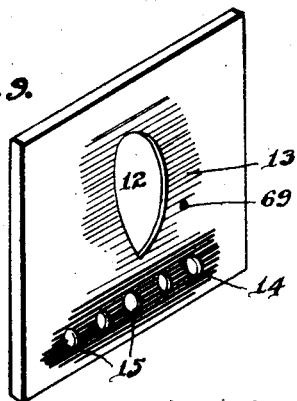
Figure 12:
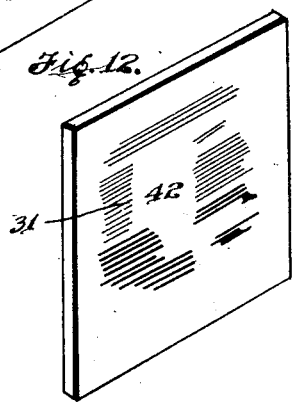
Figure 14:
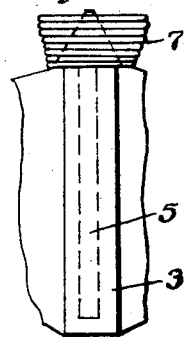
Figure 7:
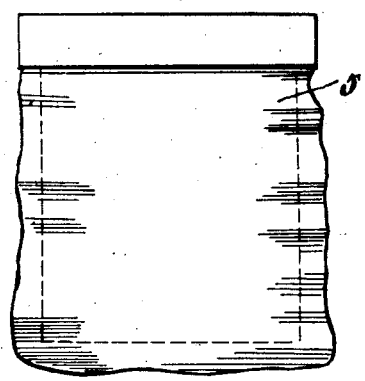
Figure 13:
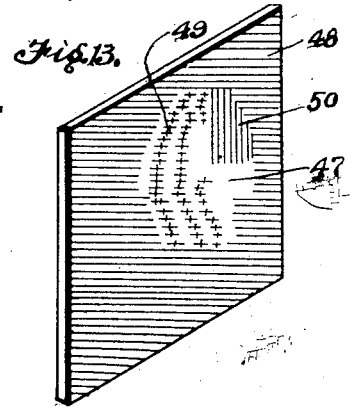
Figure 5:
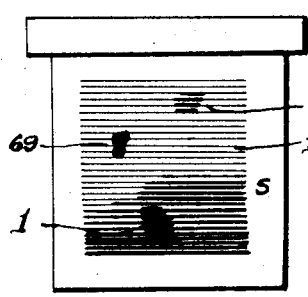
Figure 6:
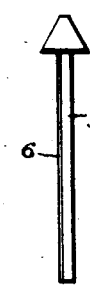
Figure 8:
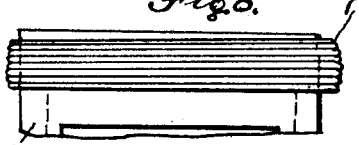

Fig. 1 is an isometric perspective view of a camera with the shader contained in it; the bellows being broken away to show the shader clearly. Fig. 2 is a section of the shader on line 2—2 of Fig. 4. Fig. 3 is a section of the shader on lines 3—3 of Fig. 4. Fig. 4 is an elevation of the shader. Fig. 5 is an elevation of an obstruction screen after exposure and the appearance of the photographically formed obstructions. Fig. 6 is a side elevation of an obstruction screen with a light proof backing. Fig. 7 is a view of an obstruction screen with a covering protecting it from light when outside the shader. Fig. 8 is an elevation of the upper part of the shader with the obstruction screen inserted in it. Fig. 9 is a view of an obstruction screen that has been manipulated after exposure. Fig. 10 is a view of a camera having two shaders. Fig. 11 is a view of a mechanically produced obstruction screen that can be used to modify the photographically produced obstruction screen. Fig. 12 is a view of obstructions photographically produced on an obstruction screen which have been modified by the use of the mechanically produced obstructions shown in Fig. 11. Fig. 13 shows an obstruction screen where the light diminishing obstructions are colored varnishes. Fig. 14 is a side elevation of the upper part of a shader with the obstruction screen inserted therein. An obstruction's effect is more localized and intensified the nearer it is positioned to the sensitive plate or film, and is diffused in proportion as it is moved nearer the lens. Placed directly in front of the plate or film it will, if dense enough, stencil the image. Placed directly at the lens, it will diminish the lighting generally over the plate without materially, or even sensibly disturbing the ratio of the lighting of one area of the image to another area thereof from the ratio existing before the obstruction screen was inserted. The screen or screens are positioned, I believe, most usefully when placed from 50% to 80% of the distance from the lens, 1, to the plate, 151 or film, 161.

All light reaching any particular area of the sensitive plate (for shortness in this discussion where plate is expressly mentioned, "or film" is to be understood) will lie in a geometrical solid having as one of the bounding surfaces the area of the lens through which passage of light is permitted by the diaphragm, generally called the undiaphragmed opening of the lens; another the figure of the particular area of the plate, and practically, but not exactly, a surface that would be generated by two right lines, lying in a plane rotating on the axis of the lens, one end of each line traversing the undiaphragmed opening of the lens, and the other a line bounding the area on the plate under consideration; the two lines not crossing between the lens and the plate. If a plane is passed perpendicular to the axis of the lens, between the lens and plate, its intersection with the surfaces of this solid will be cut in a figure that will contain all rays of light passing through the lens and reaching this area on the plate. If the two right lines in the above mentioned plane whose axis of revolution coincides with the axis of the lens cross, then two geometrical solids will be produced having coincident apices, the base of a solid will be the area on the plate, the other the undiaphragmed area of the lens. If the solid having its base the area on the plate is cut by a plane passed perpendicularly to the axis of the lens, the figure formed on this plane by the intersection of it with the surfaces of this area, will be a space through which no light passes from the lens to the plate that does not reach this area on the plate.

The shader's obstructions must cover part of the area of the figure thus formed, or must obstruct the passage of some of the light rays through it.

I have devised means whereby this can be accomplished by direct photographic action, and the necessary obstructions can be produced without need of inspecting the interior of the camera. The shader, 3, contains the obstruction screen, 5. The obstruction screen is made sensitive, photographically, and, when it has been exposed and developed, it presents a locally shaded appearance, its most shaded areas being where the light that has passed through the lens, 1, of the camera, has been received most intensely. The density of these obstructions is effected by the fact that light reflected from areas that are distinct from each other in the subject and in the image, frequently, on account of the converging of the rays passing through the lens, will reach the same area of the obstruction screen. An obstruction's area can be considered as a composite of the figures formed by the intersection of the plane containing the surface of the screen with the aforementioned geometrical solids having their bases at the lens and at the various areas on the plate, 161, and its density will vary accordingly. The shadings will be sufficiently definite to enable the operator to tell what areas of the image plate, 161, will receive the light passing through the various areas on the obstruction screen. The obstructions on the obstruction screen that are directly photographically produced are often sufficient without other manipulation of the obstruction screen.

No particular way of sensitizing the obstruction screen, 5, is necessary. A blue print mixture coated on a celluloid film may form the screen. The screen, 5, may have a backing impervious to light 6, very conveniently of black paper. The shader, 3, may have supports, 22, 22, 23, 23, to hold the screen, 5, and the closer, 4. The screens, 5, may be protected by a light proof covering, 7, that is pushed back as it is inserted in the shader, 3.

As an example of a developed obstruction screen: Fig. 5 shows a highly shaded portion, 1, a detached shaded area, 9, and a very densely shaded portion, 69, and a much less densely obstructed area or entirely unobstructed area, 18. Fig. 9 is a manipulated screen. The screen material may be cut away in an area, 12, of the darkly shaded area, 13, and the holes, 15, 15, 15, 15, made in the screen material in the very darkly shaded part, 14. Cutting holes in the screen material through the photographically produced obstructions will sharpen and brighten the picture at the areas affected by these portions of the screen, and emphasize these portions of the picture. Figs. 11 and 12 show an auxiliary screen, 85, and the developed photographically produced screen obtained by using them in the double shader camera shown in Fig. 10. The screen, 85, is placed in the front, 231, and the sensitized but undeveloped screen, 96, is placed in the holder, 3. The obstruction, 30, (carried by the arm, 31) will shade an area as 42 (see Fig. 12) from receiving light from the lens lessening the density of the photographically produced obstruction on it. The sharpness or diffusion of this decrease in density will depend on the relative distance of the obstruction, 30, from the lens and the obstruction screen. The area of lessened density, 30, may be, and it ordinarily is within a dense area, 31. Using an auxiliary screen can replace cutting the obstruction screen often. Obviously many obstruction shapes can be placed in the obstruction screens.

Using the screen originally inserted in the shader, 3, as a guide for forming an obstruction screen with transparent colors on various areas, will often produce particularly artistic results, the varying densities of areas indicating the areas to which the colors should be applied. The colors indicated in Fig. 13, are blue on the area, 48, yellow on the area, 49, and red on the area, 50, the area, 47, being left untinted. A transparent varnish tinted to the desired color is used in practice, and the screen produced photographically can either be tinted on it or a transparent screen used as the obstruction screen, the screen produced photographically being used only as a pattern. Coloring the screen locally with a transparent varnish will enable the screen to produce upon the image plate locally an effect analogous to that produced by the ordinary color screen. It will not, of course, produce any coloring of the image plate or the picture, but will accentuate or lessen merely the densening effect of a particular color of a particular area of the object on a corresponding area of the image plate.

The process of carrying out my invented art as I consider best has been indicated in part in describing the device itself, and I will now describe only the portions of the process not fully set forth above. The sensitized obstruction screen is placed in the shader and placed in the camera as shown in Fig. 1 in the bellows, 2, at the distance required between the lens and the image plate. The shutter is then opened, and the sensitized surface of the obstruction screen acted upon by the light. The area of the screen being usually only one third of the area of the plate, the intensity of the light falling on any area of it will be usually thrice that which would fall on a like area of the plate. The time of exposure of the screen will therefore be much shorter than on the plate for the same sensitized material. The screen is then removed from the camera and developed. It is then manipulated if desired and holes cut in the portions of greatest density or additional obstructions placed upon the screen, parts of the screen colored with various transparent colors such as will conduce to the effectiveness of the screen. The diminution of the detail without materially diminishing the lighting can be secured by a coating of varnish that is slightly roughened. The manipulation of the screen can also be carried out within the camera. The screen can be itself screened by an obstruction placed between it and the lens while the former is exposed. This obstruction will lighten the density of the obstruction screen at the portions it affects. This has been described above. This obstruction screen can be spaced from the screen as far as is advantageous, the nearer the lens it is the more diffused its effect upon the screen.

While this is being done, the image plate is protected from the light passing through the lens and acting upon the screen. During the exposure of the screen, this light is stopped from reaching the image plate by the body of the shader, by the backing of the screen, or the screen itself. The shutter can be closed before the screen is removed.

The screen after it has been developed, and, if desired, manipulated, is replaced in the shader, and the exposure given to form the image on the sensitive plate. This exposure will have to be somewhat longer than if no screen were used. If the screen exposed is used as a pattern only, then the one built up from it is inserted in its place in the shader, the process being otherwise the same.

Additional manually applied obstructions as 69 can be placed on the screen, 5, see Figs. 5 and 9, which can be positioned in view of the indications on the developed screen.

I claim—

1. A shader for cameras, having an obstruction screen composed of transparent material with obstructions photographically formed thereon.

2. A shader for cameras, having an obstruction screen composed of transparent material with obstructions photographically formed thereon and auxiliary obstructions formed by hand.

3. A shader for cameras, having an obstruction screen composed of transparent material, having thereon obstructions photographically formed and with diminutions of density in the more dense portions of these obstructions.

4. A shader for cameras, having an obstruction screen composed of a transparent material having thereon obstructions photographically formed and colored obstructions set with reference to the photographically formed obstructions.

5. The art of regulating locally the shading of a photograph, which consists in forming photographically an obstruction screen by exposing a sensitized screen between the lens and the image plate of a camera and removing and developing the same, replacing the screen in position and taking the photographic negative through the obstruction screen.

6. The art of regulating locally the shading of a photograph, which consists in forming an obstruction screen by exposing a sensitized screen in the camera between the lens and the image plate and removing and developing the same, treating the developed screen to change manually its shading effect, replacing the screen in position and taking the photographic negative through the screen.

7. The process of regulating locally the shading of a photograph, which consists in producing a photographic negative screen of the object, and then photographing the object upon a sensitive medium while intercepting some of the rays of light from said object by means of said negative screen.

8. The art of regulating locally the shading of a photograph, which consists in causing the light passing through the lens from the object to the sensitized medium, to pass also through an obstruction screen with photographically produced obstructions.

9. The art of regulating locally the shading of a photograph which consists in causing the light passing through the lens from the object to the sensitized medium, to pass also through an obstruction screen with photographically produced obstructions, said obstruction screen being placed between the lens and the sensitized medium and spaced from each of them.

In witness whereof I have hereunto set my signature.

MARK W. COLLET.